(12) United States Patent
Banerjee et al.

(10) Patent No.: US 11,947,410 B2
(45) Date of Patent: Apr. 2, 2024

(54) BROADBAND ERROR REMEDIATION ENGINE IN A DATA ANALYTICS SYSTEM

(71) Applicant: The Boston Consulting Group, Inc., Boston, MA (US)

(72) Inventors: Sumit Banerjee, Mclean, VA (US); Jaison Leo Justin, Austin, TX (US); Alexey Timashkov, Flower Mound, TX (US); Sai Anirudh Mandagondi, Bellevue, WA (US); Deepak Trehan, New Delhi (IN); Manuel Felipe Avella Niño, Carrera (CO); Emma Erminia Quirk, Newton, MA (US); Gowtham Sekkilar, Boston, MA (US); Tejas Arjun Bala, Blue Bell, PA (US); Elena Topolskaia, Austin, TX (US); Thomas James Steiner, Jr., Houston, TX (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 17/964,574

(22) Filed: Oct. 12, 2022

(65) Prior Publication Data

US 2023/0103264 A1 Mar. 30, 2023

Related U.S. Application Data

(63) Continuation-in-part of application No. 17/948,957, filed on Sep. 20, 2022.
(Continued)

(51) Int. Cl.
*H04L 12/00* (2006.01)
*G06F 11/07* (2006.01)
*G06F 16/29* (2019.01)

(52) U.S. Cl.
CPC .......... *G06F 11/0751* (2013.01); *G06F 16/29* (2019.01)

(58) Field of Classification Search
CPC .. G06F 11/0751; G06F 16/29; G06F 11/3684; G06F 9/451; G06F 8/656;
(Continued)

(56) References Cited

U.S. PATENT DOCUMENTS 8,695,075 B2* 4/2014 Anderson ........... H04L 63/0815
726/8
9,152,774 B2* 10/2015 Lim ...................... H04L 67/303
(Continued)

*Primary Examiner* — Frantz Coby
(74) *Attorney, Agent, or Firm* — Fish & Richardson P.C.

(57) ABSTRACT

Methods, systems, and computer storage media for providing an error remediation recommendation—for flagged incorrect values in broadband service deployment data—using a broadband error remediation engine in a data analytics system. The error remediation recommendation can identify a corrective action to resolve errors (i.e., incorrect values) in broadband service deployment data. Operationally, the broadband error remediation engine is configured to access broadband service deployment data associated with a plurality of broadband service data features. The broadband error remediation engine uses an error remediation model to and a plurality of datasets to execute a sequence of error remediation operations (e.g., checks and comparisons). Based on executing the sequence of error remediation operations, a corrective action (e.g., change geographic coordinates or remove deployment units) for an incorrect value of a broadband service feature in the broadband service deployment data. An error remediation recommendation associated with the corrective action is then communicated.

20 Claims, 13 Drawing Sheets

Related U.S. Application Data

(60) Provisional application No. 63/248,358, filed on Sep. 24, 2021.

(58) Field of Classification Search
CPC . G06F 9/45558; H04L 43/08; H04L 63/0815; H04L 67/303; H04J 14/08; H04W 64/003
USPC .................................. 714/37; 709/204, 224
See application file for complete search history.

(56) References Cited

U.S. PATENT DOCUMENTS

| | | | | |
|---|---|---|---|---|
| 9,529,602 | B1* | 12/2016 | Swierk | G06F 9/45558 |
| 9,577,746 | B2* | 2/2017 | Nielsen | H04L 43/08 |
| 9,660,729 | B2* | 5/2017 | Totten | H04J 14/08 |
| 10,528,454 | B1* | 1/2020 | Baraty | G06F 11/3684 |
| 10,846,204 | B2* | 11/2020 | Vaishnav | G06N 20/00 |
| 2018/0049043 | A1* | 2/2018 | Hoffberg | H04W 64/003 |
| 2020/0162503 | A1* | 5/2020 | Shurtleff | G06F 9/451 |
| 2022/0043791 | A1* | 2/2022 | Dwarampudi | G06F 8/656 |

\* cited by examiner

US 11,947,410 B2

BROADBAND ERROR REMEDIATION ENGINE IN A DATA ANALYTICS SYSTEM

CROSS-REFERENCE TO RELATED APPLICATIONS

This application is a continuation in part of U.S. patent application Ser. No. 17/948,957 filed on Sep. 20, 2022, which itself claims the benefit of U.S. Provisional Application No. 63/248,358 filed on Sep. 24, 2021, the entire contents of each are incorporated herein by reference.

BACKGROUND

Many companies rely on data analytics systems for computational analysis of data or statistics to discover, interpret, and communicate important patterns in data. A data analytics system can operate based on different types of datasets to facilitate business analytics including training machine learning models and performing predictive analysis. For example, a dataset can be used in a commercial services application, where the dataset includes customers, accounts, and transactions. A data analytics system can also be used to perform data remediation. For example, a data analytics system can support different processes associated with cleansing, organizing, and migrating data to meet business needs. In this way, a data analytics system can support correcting errors and mistakes in data to eliminate data-quality issues.

Conventionally, data analytics systems are not configured with a computing infrastructure and logic to intelligently remediate errors in broadband service data (i.e., data associated with existing and expansion of broadband service in geographical regions). Conventional techniques for addressing errors (e.g., data inconsistencies and changes in use and status of broadband-enabled properties) in broadband service data can include human intervention and manual review, which can be impractical and expensive. For example, an agent may be assigned to manually investigate newly completed constructions or abandoned premises in order to update broadband service data. Such methods are inefficient and cannot scale to support multiple and different types of geographical regions. As such, a more comprehensive data analytics systems—having an alternative basis for providing broadband data analytics systems error remediation operations—can improve computing operations and interfaces in data analytics systems.

SUMMARY

Various aspects of the technology described herein are generally directed to systems, methods, and computer storage media, for among other things, providing an error remediation recommendation—for flagged incorrect values in broadband service deployment data—using a broadband error remediation engine in a data analytics system. The error remediation recommendation can identify a corrective action to resolve errors (i.e., incorrect values) in broadband service deployment data. For example, the broadband service data can include broadband service data features (e.g., geolocation coordinates, address, and unit count)—having incorrect values of broadband service data feature can be flagged, such that, a corrective action and be identified for the incorrect value of the broadband service data feature.

Operationally, the broadband error remediation engine is configured to access broadband service deployment data, the broadband service deployment data is associated with a plurality of broadband service data features. The broadband error remediation engine uses an error remediation model and a plurality of datasets to execute a sequence of error remediation operations (e.g., sequential checks and comparisons) on the broadband service deployment data. Based on executing the sequence of error remediation operations, a corrective action (e.g., change geographic coordinates or remove deployment units) for an incorrect value of a broadband service data feature is identified. The corrective action for the incorrect value is associated with a flagged incorrect value of a broadband service data feature in the broadband service deployment data. An error remediation recommendation associated with the corrective action is communicated. The error remediation recommendation can be associated with a level of confidence score (e.g., based on type and degree of match from the plurality datasets).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
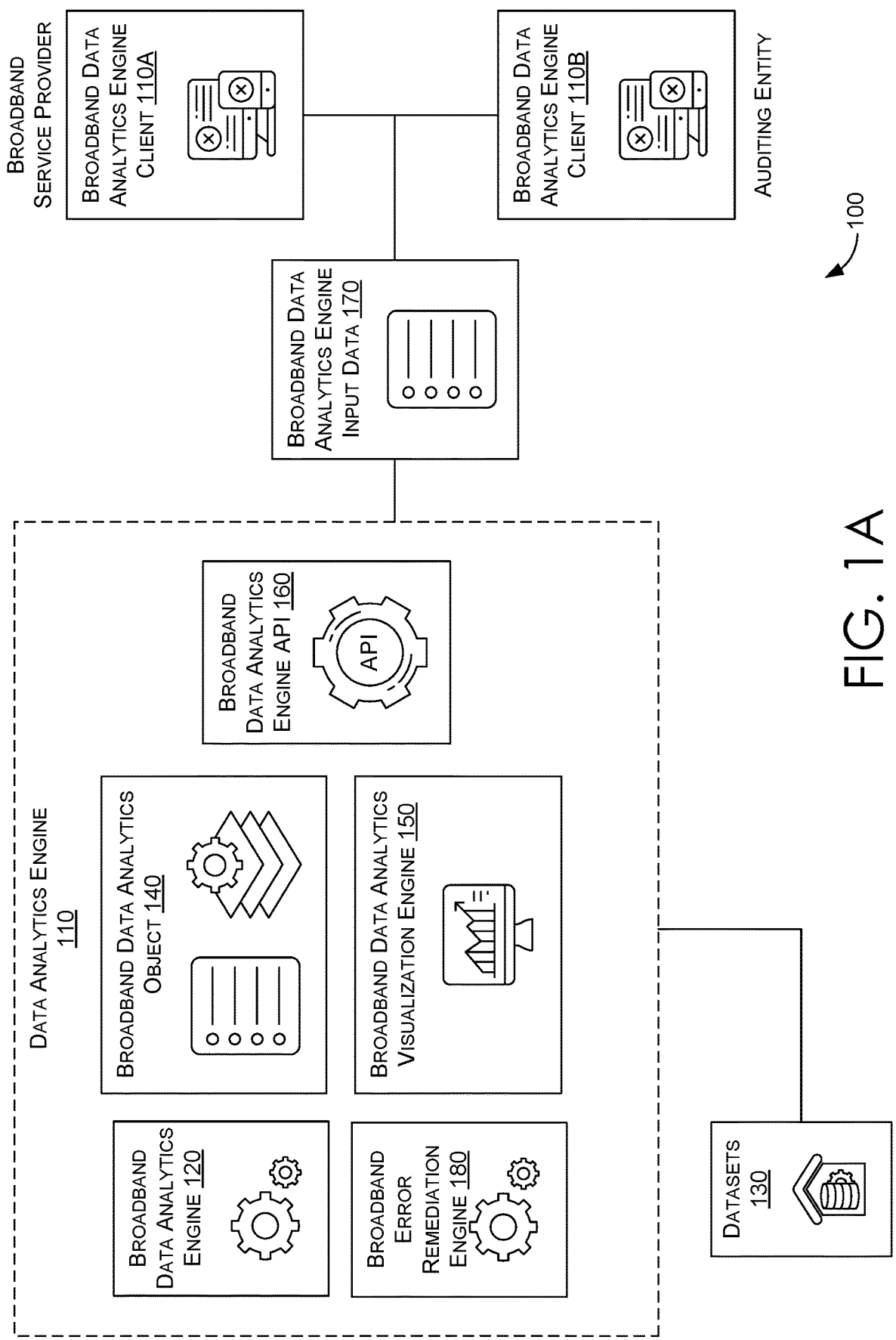
FIGS. 1A and 1B are block diagrams of an exemplary data analytics system with a broadband error remediation engine, in which embodiments described herein may be employed.

By way of background, a data analytics system can support performing computational analysis of data or statistics to discover, interpret, and communicate important patterns in data. Many companies (e.g., retail, manufacturing, travel, construction) implement data analytics systems to gather, monitor, track, model, and deploy data-driven insights to create competitive advantages. Data analytics can include business analytics that includes iterative explorations and investigations of past business performance to gain insights and drive business planning. In particular, business analytics data includes datasets that can improve business analytics processes.

By way of example, business analytics systems can be used to support operations associated with a public utility. A public utility ("utility") can refer to a maintained infrastructure for a public service. Utilities are meant to supply goods or services that are considered essential (e.g., water, gas, electricity, telephone, and broadband). In particular, broadband refers to wide bandwidth data transmission which transports multiple signals and traffic types. Broadband can be coaxial cable, optical fiber, radio, twisted pair, or satellite. With reference to internet access, broadband can refer to high-speed internet access that is always on and faster than dial-up access. Recent global activities (e.g., natural disasters or pandemics) are increasingly making the case of broadband as a top essential utility. Governments are also taking action to improve the availability of broadband. For example, governments have multiple broadband funds that help subsidize providing broadband services.

Nonetheless, it can be challenging to find the type of data needed to support expanding broadband availability. There is a lack of data sources that describe broadband service data. Broadband service data can refer to data associated with providing or expanding access to broadband functionality. Broadband service data can further describe broadband availability associated with a geographical region—where broadband availability ranges from whether broadband exists to if it does, the type of service and corresponding configuration and customers. In particular, in rural areas (e.g., non-metropolitan areas) there is limited information on whether broadband service exists, and if broadband service exists, there is limited information on the type of broadband service and who the customers of the broadband service are. For example, there are no details on whether a specific residential building or commercial building has broadband service, the type of broadband service, and how many customers have broadband service or how many customers do not have broadband service. This problem exists in part because certain geographical regions are underserved—with regard to availability of broadband service—and as such, datasets that describe these underserved geographical regions do not exist.

Expansion of broadband services—such as through government-sponsored initiatives or for growth of broadband service provider—can be more efficiently performed with an understanding of the current broadband availability in for a geographical region. In particular, certain government-sponsored initiatives may provide specific criteria that should be satisfied to qualify for the government-sponsor subsidization funds or credits associated with the initiative. Or a broadband service may have certain business criteria that should be satisfied to provide a business justification for moving forward with expanding broadband service in a particular geographical region.

Government-sponsored programs for expanding broadband service include audits of broadband service deployment data of broadband service providers participating in such programs. Broadband service providers can build out broadband service in full; however there may exist errors in their deployments (i.e., incorrect values in broadband service deployment data). For example, data inconsistencies and changes in the use and status of broadband-enabled properties (e.g., completed constructions and abandoned premises) put the broadband service providers at risk of not passing the audit.

Conventionally, data analytics systems are not configured with a computing infrastructure and logic to intelligently remediate errors in broadband service data (i.e., data associated with existing and expansion of broadband service in geographical regions). Conventional techniques for addressing errors (e.g., data inconsistencies and changes in use and status of broadband-enabled properties) in broadband service data can include human intervention and manual review, which can be impractical and expensive. For example, an agent may be assigned to manually investigate newly completed constructions or abandoned premises in order to update broadband service data. Such methods are inefficient and cannot scale to support multiple and different types of geographical regions. Moreover, such manually-gathered information is not associated with interfaces that can provide user interface operations for error remediation of the broadband service data. In particular, broadband service providers are unable to remediate errors broadband service deployment data in a timely manner. Physical verification is extremely expensive and impractical given the number of locations that need error remediation. Error remediation of broadband service deployment data can implicate access to funding and success of auditing process performed by an auditing entity. As such, a more comprehensive data analytics systems—having an alternative basis for providing broadband data analytics systems error remediate operations—can improve computing operations and interfaces in data analytics systems.

Embodiments of the present disclosure are directed to providing an error remediation recommendation—for flagged incorrect values in broadband service deployment data—using a broadband error remediation engine in a data analytics system. The error remediation recommendation can identify a corrective action to resolve errors (i.e., incorrect values) in broadband service deployment data. For example, the broadband service data can include broadband service data features (e.g., geolocation coordinates, address, and unit count)—incorrect values of broadband service data feature are flagged, such that, a corrective action and be identified for the incorrect value of the broadband service data feature.

Operationally, the broadband error remediation engine is configured to access broadband service deployment data, the broadband service deployment data is associated with a plurality of broadband service data features. The broadband error remediation engine uses an error remediation model and a plurality of datasets to execute a sequence of error remediation operations (e.g., sequential checks and comparisons) on the broadband service deployment data. Based on executing the sequence of error remediation operations, a corrective action (e.g., change geographic coordinates or remove deployment units) for an incorrect value of the broadband service data feature is identified. The corrective action for the incorrect value is associated with a flagged incorrect value of a broadband service data feature in the broadband service deployment data. An error remediation recommendation associated with the corrective action is communicated. The error remediation recommendation can be associated with a level of confidence score (e.g., based on type and degree of match from the plurality datasets).

At a high level, the data analytics system and broadband error remediation engine can support performing broadband data analytics operations that include process steps, ruleset algorithms, advanced analytics, geocoding, and data structures. In particular, the ruleset algorithm can follow a waterfall analytics model which uses geospatial datasets to review records flagged for potential risk of rejection by an audit and recommend necessary changes to correct erroneous attributes (e.g., geolocation coordinates, address, unit count, etc.). Geospatial technology, advanced analytics, and automated processes can be used to pinpoint and remediate such inconsistencies. The data models, analytics, and geospatial approach support programmatically remediating broadband service deployment data errors.

The broadband error remediation engine provides a geospatial error remediation model that performs a sequence of error remediation operations (e.g., checks and comparisons) with a plurality of data sources (e.g., multiple independent third-party sources) and suggests a best possible remediation action. The broadband error remediation engine supports proposing correction actions (e.g., change geographic coordinates, remove deployment units) and differentiates between various levels of confidence for error remediation recommendation based on type and degree of match (e.g., exact match or fuzzy match). The broadband error remediation engine further supports identifying records that lack sufficient data for a conclusive recommendation and flags them for additional manual review.

The broadband error remediation engine access a plurality of datasets (e.g., geospatial datasets, spatial datasets, and address datasets and a building information model) and performs dynamic prioritization of highest quality of the dataset for a particular geographical region. For example, a first geospatial dataset may be identified as the highest quality dataset for a first geographical region; however, a second geospatial dataset can be identified as the highest quality data set for a second geographical region. As such, operationally, the broadband error remediation engine dynamically selects a dataset that is of highest quality for the geographical region associated with the broadband service deployment data under evaluation.

The broadband error remediation engine is associated with an error remediation logic. The error remediation logic supports performing error remediation operations. For example, error remediation operations can include a sequence of checks and comparisons, which result in error remediation actions. In operation, when an error remediation recommendation cannot be provided with certainty based on a first check in the error remediation logic, another check can be performed to identify an error remediation recommendation. In this way, errors are sifted through multiple stage-gates and only remaining records that could not be remediated in any of the error remediation logic steps are passed on for manual verification.

The broadband error remediation engine can be implemented via a scripting language. For example, the code may be written in a command line interface that allows execution via a command line interface. Other types of interfaces (e.g., broadband data analytics engine interface) are contemplated for executing the functionality associated with the broadband error remediation engine. For example, a broadband data analytics engine interface can support exporting error remediation results that can be reviewed in different file formats.

The broadband data analytics engine is responsible for generating the error remediation model that is implemented via the broadband error remediation engine. The broadband data analytics engine aggregates data from a plurality of data sources. The aggregated data can specifically include geospatial data. Geospatial data associated with geospatial analysis such as gathering, displaying, and manipulating imagery, GPS, satellite photography and historical data. The geospatial data can be described explicitly in terms of geographic coordinates or implicitly in terms of street address, postal code, or other types of geographical region identifiers. The error remediation model is based on an error remediation logic with a plurality of algorithms (e.g., parcel lookup, geocoder vote, equipment data, and excess parcel). For example, the error remediation logic can include a sequence of checks and comparisons for proposing corrective actions and alternative values for incorrect values of broadband service data features in a broadband service deployment data.

The error remediation logic can include different operations (i.e., error remediation operations) associated with different algorithms. Operations can include finding a matching parcel in each location, removing excess locations for each parcel, and adjusting unit count (i.e., deployment unit or deployment location) to match external datasets. At each step, a set of fallout records can be identified for manual remediation. After adjusting the unit count to match external datasets, remediated records can then be identified. In some instances, a sample of remediated records can be identified for manual validation. Each operation (i.e., algorithm step) can include a set of tests, criteria, and thresholds. Records satisfying the checks can be selected and recommended for error remediation actions. The error remediation logic can be performed at an expected level of an audit model. For example, the FCC performs broadband service deployment data audits at a location level. It is contemplated that the error remediation logic can be performed at a location level or a unit level, where the unit level provides increased accuracy.

Advantageously, based on executing the sequence of error remediation operations, a corrective action for an incorrect value of the broadband service data feature is identified. The corrective action for the incorrect value is associated with a flagged incorrect value of a broadband service data feature in the broadband service deployment data. An error remediation recommendation associated with the corrective action is communicated.

Aspects of the technical solution can be described by way of examples and with reference to FIGS. 1A, 1B and 1C-1F. FIG. 1A illustrates a data analytics system 100 including data analytics engine 110, broadband data analytics engine client 110A (e.g., broadband service provider) and broadband analytics engine client 110B (e.g., auditing entity). The data analytics engine 110 further includes broadband data analytics engine 120, datasets 130, broadband data analytics object 140, broadband data analytics visualization engine 150, broadband data analytics engine API 160, and broadband error remediation engine 180.

The broadband data analytics engine 120 is responsible for generating broadband data analytics objects that are used to perform broadband data analytics operations. The broadband data analytics object 140 supports circumventing manual aggregation of broadband service data. And, the broadband data analytics engine 120 supports programmatically generating the broadband data analytics object 120 as a representation of aggregated broadband service data. The broadband data analytics object 140 can be provided via a broadband data analytics interface (e.g., a visualization) for managing (e.g., capturing, filtering, analyzing, validating, and communicating, and viewing) broadband service data (e.g., input data). In particular, the broadband data analytics object 140 can be used to validate broadband service deployment data.

By way of illustration, a broadband service provider (e.g., via a broadband data analytics engine 110A) can provide broadband service deployment data that is compared to broadband service data—using the broadband data analytics object 140—to validate the broadband service deployment data. A determination can be made whether there exists any inconsistencies between the broadband service deployment data and the broadband data analytics object—that is a representation of aggregated broadband service data for a geographical region. The broadband data analytics object 140 can further be used to communicate broadband service deployment data to an auditing entity (e.g., via API and a broadband data analytics engine 110B).

The broadband data analytics engine 120 is also responsible for generating the broadband data analytics object computation model that is used in generating the broadband data analytics object 140. The broadband data analytics object computation model supports generating broadband data analytics objects associated with broadband service availability for corresponding geographical regions. The broadband data analytics object computation model can receive input data (e.g., broadband expansion targeting constraints or broadband service deployment data) to determine how to generate the broadband analytics data object.

By way of illustration, broadband expansion targeting constraints can include broadband service data features of geographical region that is targeted for expansion (e.g., criteria of a broadband service provider expansion plan). And, broadband service deployment data can include broadband service data features associated with a deployment of broadband data service (e.g., details of deployed broadband data service of a broadband data service provider). In this way, input data (i.e., broadband expansion target constraints or the broadband service deployment) data can indicate a geographical region, addresses, building footprints that are used in generating a corresponding broadband data analytics object of aggregated broadband service data—using the broadband data analytics object computation model. As such, the broadband data analytics object corresponds to the input data—and the broadband data analytics object can be used to perform broadband data analytics operations on the input data. Moreover, the broadband data analytics object can be communicated to cause analysis of the broadband data analytics object via predictive analysis model of a broadband service provider, or broadband service expansion analysis model, or a broadband service deployment auditing model. For example, the broadband data analytics object can be used to make predictions for a broadband service provider (e.g., using a machine learning model), perform analysis on how to effectively expand broadband service in different geographical regions.

The broadband error remediation engine 180 supports communicating error remediation recommendations that include corrective actions for incorrect values of broadband service data features in broadband service deployment data. The broadband error remediation engine 180 can operate with the broadband data analytics engine 120, broadband data analytics visualization engine 150, broadband data analytics engine API 160 to provide functionality described herein. A broadband data analytics engine client (e.g., broadband service provider) can cause execution of the broadband error remediation engine 180 to communicate broadband data analytics input data (i.e., broadband service deployment data) to the data analytics engine 110 and the broadband error remediation engine 180. Based on the broadband data analytics engine input data, the broadband error remediation engine 180 executes error remediation operations using an error remediation model (not shown) and a plurality of data sets (e.g., datasets 130) to identify corrective actions for incorrect values of the broadband data service features of the broadband service deployment data. The data analytics engine 110 can communicate error remediation recommendations comprising the corrective action to the broadband data analytics engine client.

The broadband error remediation engine 180 can be implemented in via a scripting language. For example, the code may be written in a command line interface that allows execution via a command line interface. It is contemplated that the broadband error remediation engine 180 can operate with the functionality described herein with reference to broadband data analytics visualization engine 150 to support communicating the error remediation recommendations and corrective actions.

Figure 1B:
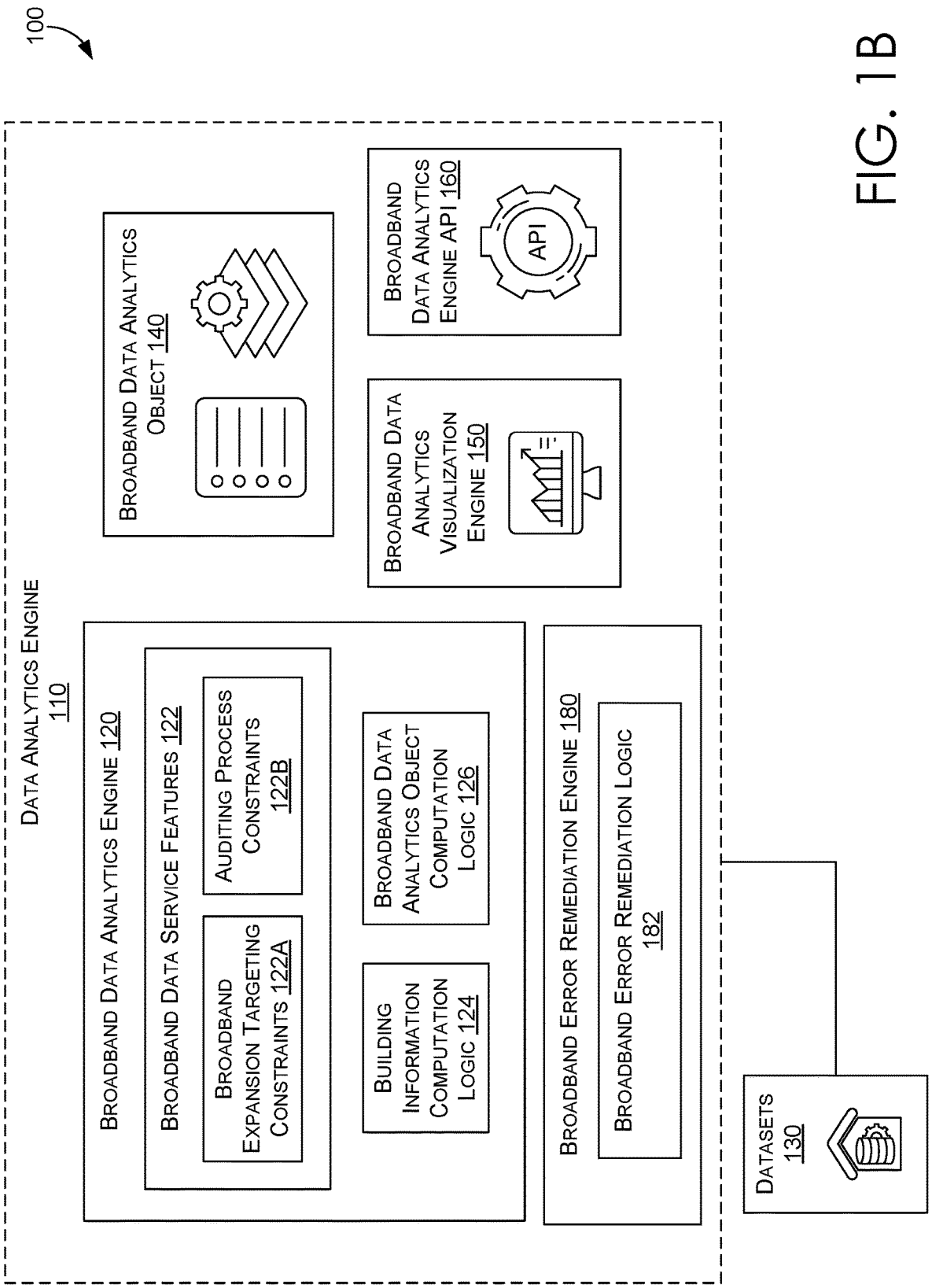

With reference to FIG. 1B, FIG. 1B illustrates aspects of the data analytics engine 110 that includes broadband data analytics engine 120, datasets 130, broadband data analytics object 140, broadband data analytics visualization engine 150, broadband data analytics engine API 160. The broadband data analytics engine 120 further includes broadband service data features 122—including broadband expansion targeting constraints 122A and auditing process constraints 122B; building information computation logic 124, and broadband data analytics object computation logic 126; broadband error remediation engine 180 with broadband error remediation logic 182 and broadband error remediation model 184.

The data analytics system 100 (i.e., broadband data analytics system) is responsible for providing a broadband data analytics object for a geographical region—such that the broadband data analytics object is a representation of broadband service data for the geographical geographic region. The data analytics system is an end-to-end data analytics system that include the broadband data analytics engine 120 and provides access (e.g., via a broadband data analytics API) to broadband data analytics objects to view, analyze, and process broadband service data.

The broadband data analytics engine 120 is responsible for using the building information computation logic 124 and the broadband data analytics object computation logic 126. The building information computation logic 124 supports using geo-datasets (e.g., datasets 130) to generate building information models that are used in generating the broadband data analytics object computation model—for generating the broadband data analytics object. The building information model is a representation of data types (e.g., building-related broadband service data) associated with providing broadband service data. For example, a building information model can include information associated with a building including addresses, building footprints, and parcels. The building information model can be generated based historical information of non-compliant locations such that rules can be defined based on historical information of buildings that were not compliant. As such, the building information computation logic 124 supports using datasets (e.g., geospatial datasets, parcel datasets, address datasets) to create a building information model associated with broadband service.

The broadband data analytics object computation logic 126 refers to the logic in the broadband data analytics objection model that is used to generate the broadband data analytics object. The broadband data analytics objection computation logic 126 can be associated with broadband service data features 122 including broadband expansion targeting constraints 122A and auditing process constraints 122B. The broadband data analytics engine 120 accesses broadband service data features 122 to generate the broadband data analytics objects. Broadband service data features are attributes or variables of associated with providing broadband service. Broadband service features can be for existing broadband service or for expanding broadband service in a geographical region. Broadband service features can be used to develop a broadband data analytics object computation model. In particular, the broadband data analytics object computation model can include a compliance assessment ruleset and a decision that are used to generate a broadband data analytics object. The broadband data analytics object computation model is generated based on geographically-based datasets (e.g., addresses, building footprints, and parcels). In particular, the compliance assessment ruleset and decision tree are a set of rules that comprise checks on input data (e.g., broadband expansion target constraints or broadband deployment data), the checks are associated with location accuracy, risk of duplicates, level of confidence in number of units. The ruleset leverages data analytics tools to programmatically validate input data based on decision trees that are based on audit logic. Input data is processed through the broadband data analytics object computation model to generate a broadband data analytics object that can be used to visualize validation details.

The broadband service data features include broadband expansion targeting constraints 122A and auditing process constraints. The broadband expansion targeting constraints refer to traits that are used for targeting broadband expansion to geographical regions. For example, a type of building may be broadband expansion targeting constraint—such whether a specific building is a residential building or a commercial building; whether the building already has broadband service; the type of service the building already has, etc.

The auditing process constraints refer to compliance assessment parameters for broad expansion to geographical regions. For example, government-sponsored initiatives can indicate specific requirements that should be met in order to receive incentives for expanding broadband service. For example, a geographical region, a type of building, and a type of broadband service are auditing process constraints that are captured as broadband service data features.

Broadband service data features can also be associated with business criteria that should be satisfied to provide justification moving forward with expanding broadband service. In this way, broadband service data features can be used to provide a representation of broadband service that is associated with a particular geographical regions and more granularly buildings in the geographical region.

The broadband data analytics API 160 is responsible for providing different types of access to functionality provided via the data analytics engine 110. The broadband data analytics API 160 supports accessing broadband data analytics engine input data. The broadband data analytics API 160 supports validating one or more broadband deployment data attributes. The broadband data analytics API 160 supports communicating a broadband data analytics object to cause analysis of the broadband data analytics object at one or more analysis models.

The broadband data analytics visualization engine 150 is responsible for generating a broadband service data visualization. The broadband data analytics visualization engine 150 provide access to broadband service data via broadband data analytics object layers. The broadband data analytics object layers can be identified can identify geographic regions via geohash identifiers. The broadband service visualization engine 150 can be provided based on a web-service that provides a broadband data analytics interface for accessing broadband service data associated with the broadband data analytics object.

The broadband data analytics visualization engine 150 operates to generate interface data. Interface data includes user interface elements, broadband data analytics graphical interface elements, broadband data analytics results data, and instructions on how to generate corresponding user interfaces that support interactions between users and the broadband data analytics system. User interfaces allow effective operation and control by users while the data analytics simultaneously perform computing operations. Interface data can include graphical user interfaces that allow users to interact with the data analytics system through graphical user interface elements. A graphical user interface can include a web-service interface that provides a visual display of data. As shown in FIGS. 1C-1F, geographical region data layers (e.g., location coordinates, building footprints, parcels) that be presented at different levels of granularity corresponding to broadband service data in web-service interface.

The broadband error remediation engine 180 provides broadband error remediation logic 182 and broadband error remediation model 184. The error remediation logic 182 supports performing error remediation operations. For example, error remediation operations can include a sequence of checks and comparisons, which result in error remediation actions. The error remediation model is based on an error remediation logic 182 with a plurality of algorithms (e.g., parcel lookup, geocoder vote, equipment data, and excess parcel). For example, the error remediation logic 182 can include a sequence of checks and comparisons for proposing corrective actions and alternative values for incorrect values of broadband service data features in a broadband service deployment data.

With reference to FIG. 1C-1F. FIG. 1C-1F illustrate aspects—schema representations of error remediation logic (e.g., algorithms)—associated with providing an error remediation recommendation—for flagged incorrect values in broadband service deployment data—using a broadband error remediation engine 180. The broadband data analytics engine 120 and broadband error remediation engine 180 can be provided via a web-service. The web-service can support operations and communications between devices in the data analytics system 100. The web-service can be implemented such that a plurality of users of the web-service (e.g., broadband data analytics engine client 110A or broadband data analytics engine client 110B) have corresponding operating environments for executing operations with the web-service that provide the functionality described herein. The web-service operating environment can include standardized and tailored operating environment features. For example, the operating environment can be tailored for a broadband service provider or an auditing entity for performing corresponding broadband data analytics operations. The web-service can further operate with the broadband data analytics engine API 160 to provide the functionality described herein.

The broadband error remediation engine 180 provides an error remediation model—having a broadband error remediation logic 182—that supports a plurality of error remediation algorithms for performing error remediation operations. The error remediation algorithms include parcel lookup, gecoder vote, equipment data, and excess locations per parcel algorithms. Each algorithm support identifying different types of corrective actions for incorrect values in the broadband service deployment data.

Figure 1C:
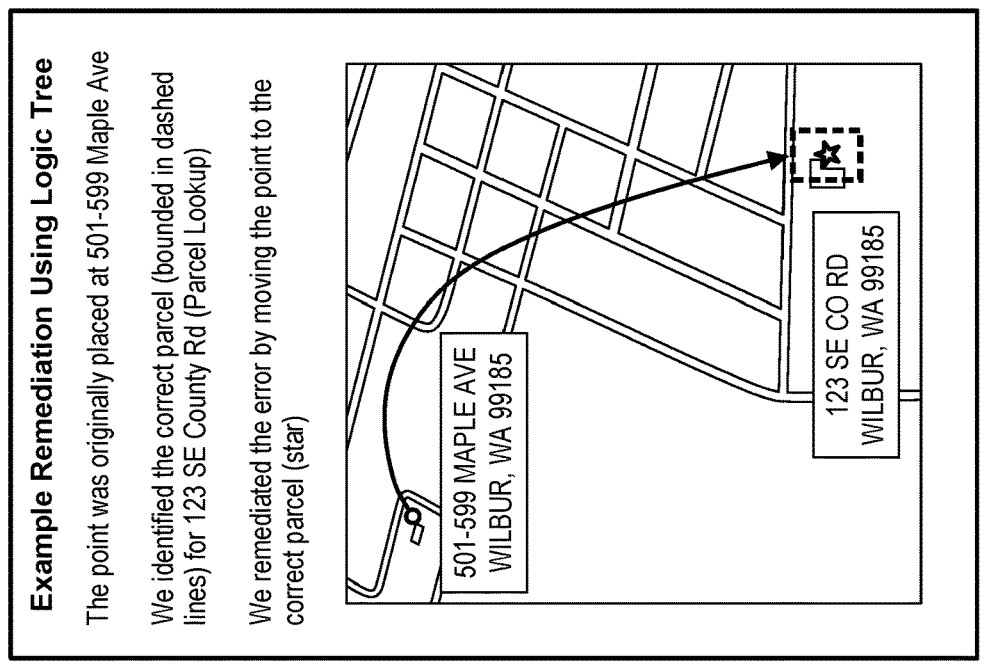
FIG. 1C-1F are exemplary schematics associated with a data analytics system with a broadband error remediation engine, in which embodiments described herein may be employed.
Figure 1C:
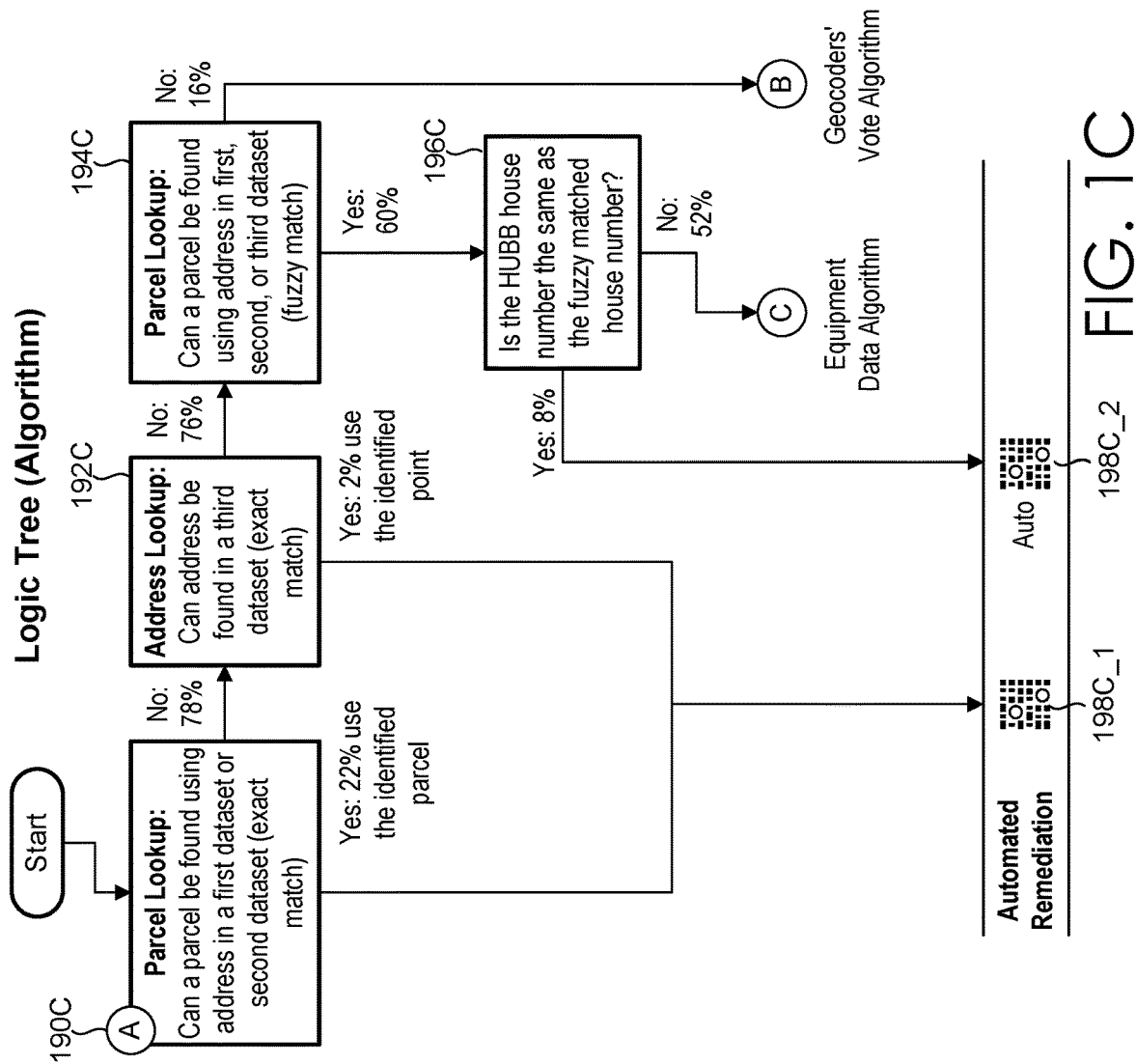

Turning to FIG. 1C, FIG. 1C illustrates the parcel lookup operations. The parcel lookup operations supports identifying a correct parcel associated with an address and move the address (e.g., represented via a point) to the correct parcel. The parcel lookup operations include parcel lookup block 190C, address lookup block 192C, parcel lookup block 194C, and house number lookup block 196C. At parcel lookup block 190C, a determination is made whether a parcel can be found using a first dataset or a second dataset via an exact match. At address lookup block 192C, a determination is made whether an address can be found in a third dataset via exact match. At address lookup block 194C, a determination is made whether a parcel can be found using an address in a first dataset, a second dataset, or a third dataset via fuzzy match. At house number lookup block 196C, a determination is made whether a house number is the same as a fuzzy matched house number.

When lookups are successfully in parcel lookup block 190C and address lookup block 192C an automated remediation action 198C_1 is taken (e.g., the identified correct value is used to replace the incorrect value). When the parcel lookup block 194C is successful, the house number lookup 196C is executed, and when the house number lookup block 196C is successful, an automated remediation action 198C_2 is taken. When the parcel lookup block 194C is unsuccessful, the geocoder vote operations can be performed; and when the house number lookup block 196C is not successful, the equipment data operations can be performed. For example, the point was originally placed at 501-599 Ave and the correct parcel was identified at 123 SE County Rd. To remediate the error, the point is moved to the correct parcel.

Figure 1D:
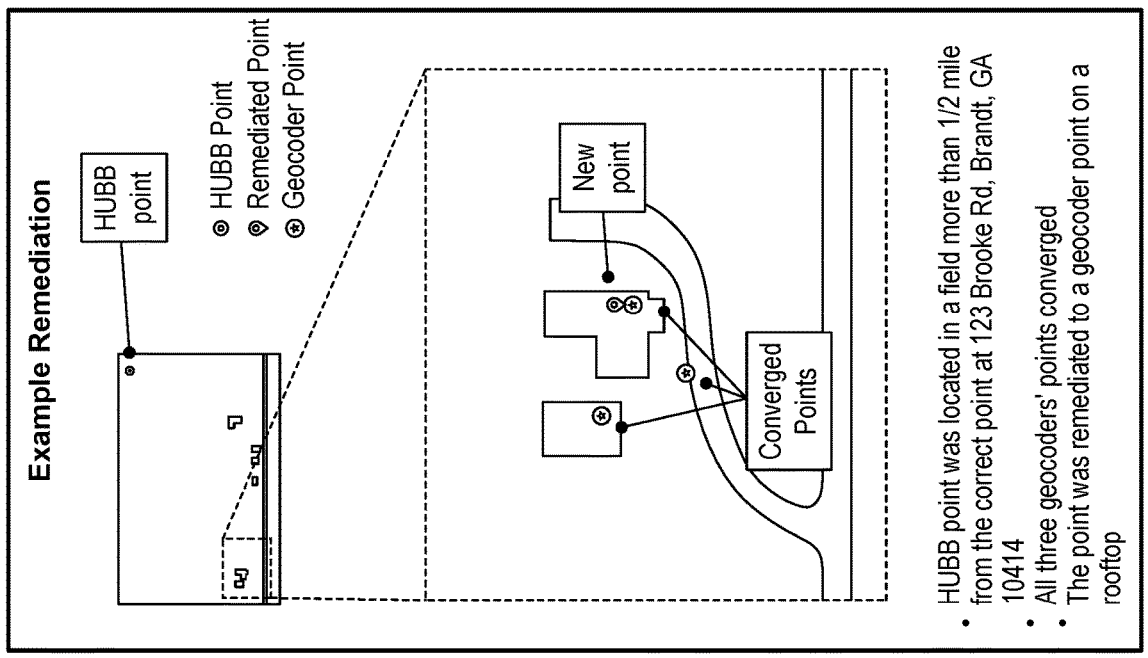
Figure 1D:
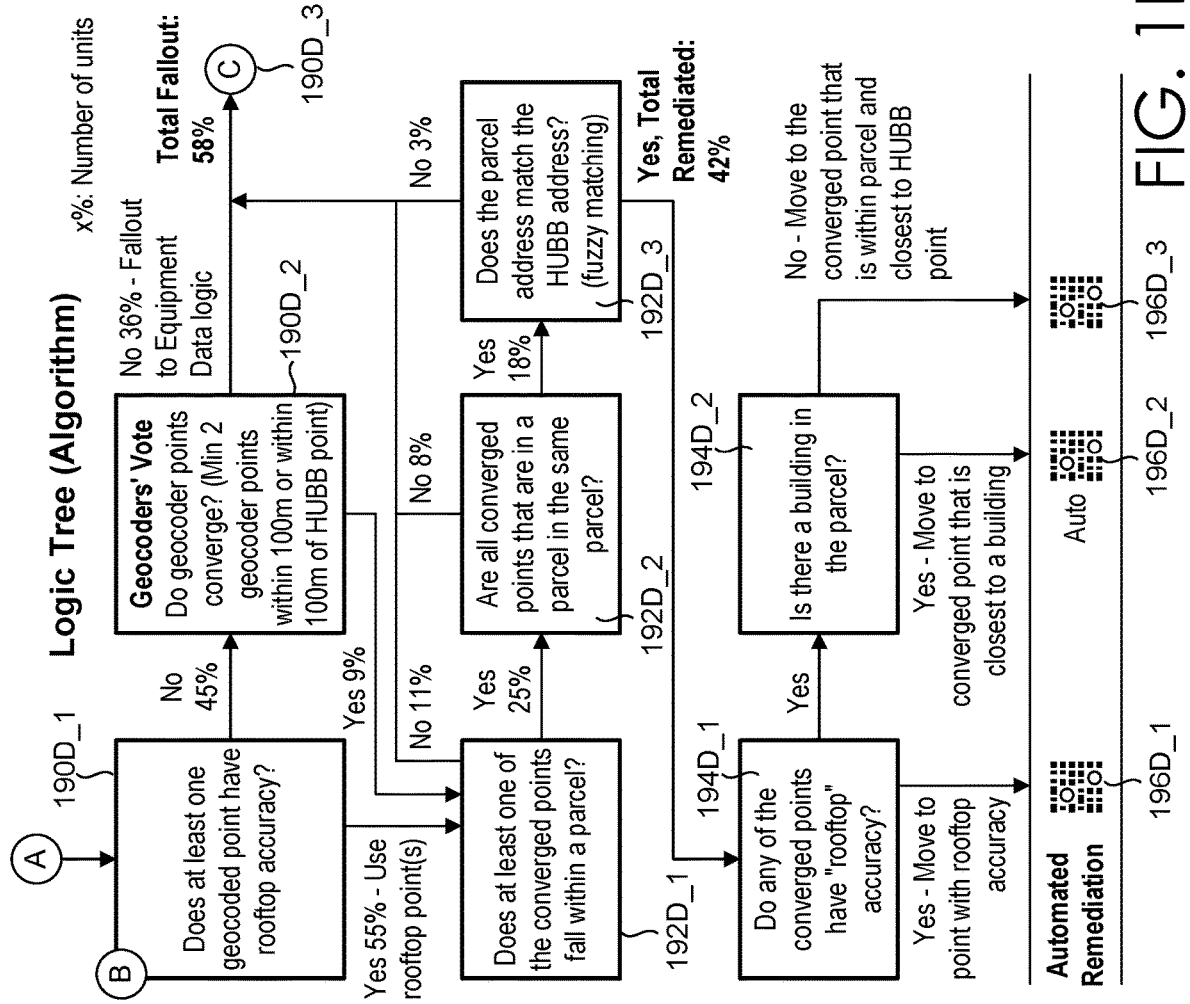

Turning to FIG. 1D, FIG. 1D illustrates the geocoder vote operations. The geocoder vote operations support assessing convergence of four distinct points. At block 190D_1 a determination is made whether at least one geocoded point has rooftop accuracy. At block 190D_2—and when the determination at block 109D_1 is no—a determination is made whether geocoder points converge. At block 192D_1—and when the determination at block 190D_1 is yes; or when the determination at block 190D_2 is yes—a determination is made whether at least one of the converged points falls within a parcel. At block 192D_2—and when the determination at block 192D_1 is yes—a determination is made whether all converged points that are in a parcel in the same parcel. At block 192D_3—and when the determination at block 192D_2 is yes—a determination is made whether the parcel address matches the HUBB address. At block 192D_1, block 192D_2, and 192D_3 when the determinations are no—a total fallouts are identified at 190D_3.

At block 194D_1—and when the determination at block 192D_3 is yes—a determination is made whether any of the converged points have rooftop accuracy. At block 194D_2—and when the determination at 194D_1 is yes—a determination is made whether a building exists in parcel. At block 196D_1—and when the determination at block 194D_1 is yes—a remediation action is determined to move to point with rooftop accuracy. At block 196D—and when the determination at block 194D_2 is yes—a remediation action is determined to move to a converged point that is closest to a building. At block 196D_3—and when the determination at block 194D_2 is no—a remediation action is made to move the converged point that is within the parcel and closes to the HUBB point. For example, if a HUBB point was located in a field more than ½ a mile from a correct point at 123 Brooke Rd, Brandt, GA 14104—all three geocoders' point would converge, and the point is remediated to a geocoder point on a rooftop.

Figure 1E:
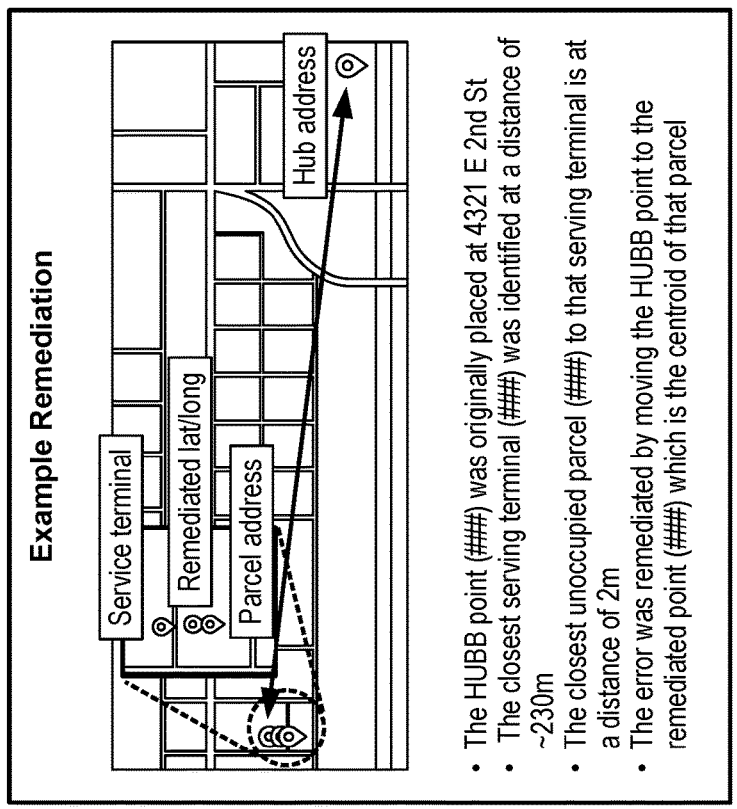
Figure 1E:
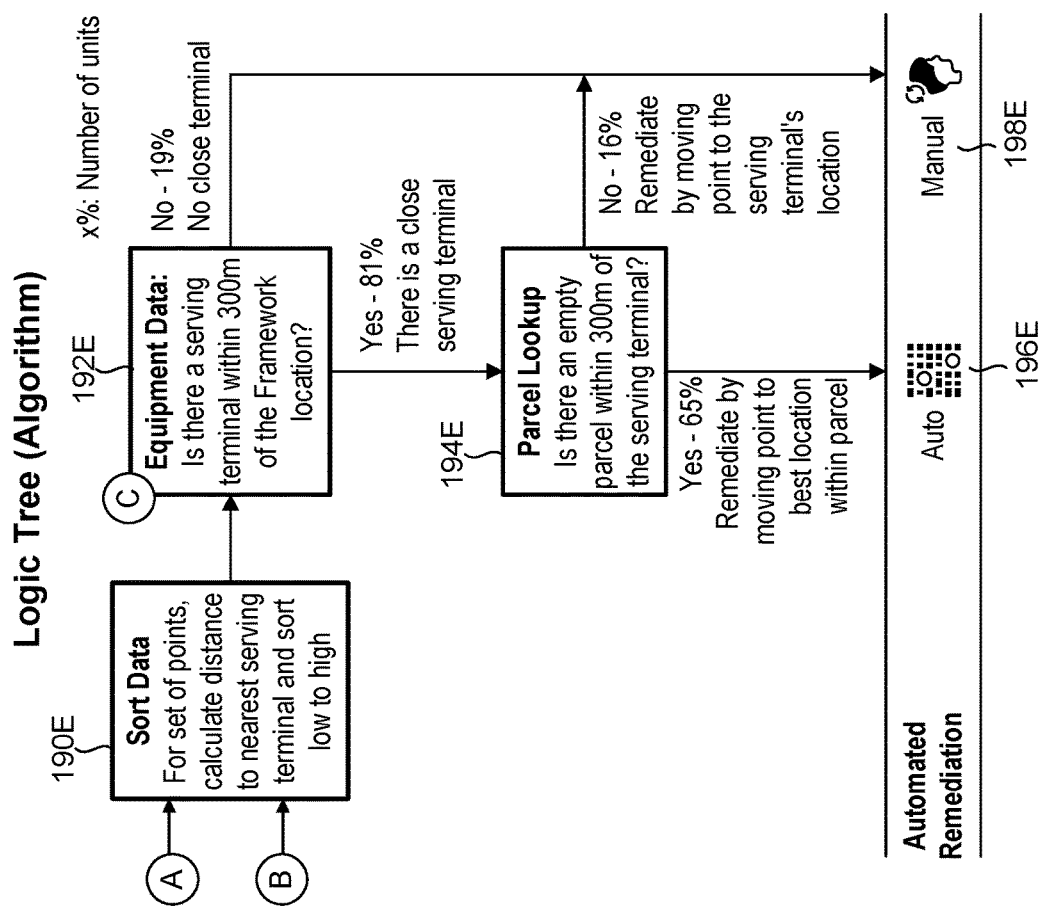

Turning to FIG. 1E, FIG. 1E illustrates the equipment data operation. The equipment data operations support remediating errors by finding empty parcels near a serving terminal. At block 190E, for a set of points, a distance is calculated to a nearest serving terminal and sorted from low to high. At block 192E, a determination is made whether there exists a servicing terminal within a predefined distance (e.g., 300 m) of a framework location. Even the distance is increase, it is contemplated that increase in serving terminals is relatively small. There exists the potential to vary the distance, and parcel lookup distance, in urban versus rural scenarios to improve accuracy. At block 194E—and when the determination at block 192E is yes—a determination is made whether there exists an empty parcel with a predefined distance of the serving terminal. At block 196E—and when the determination at block 194E is yes—a remediation action is identified to move the point to the best location within the parcel. At block 198E—and when the determination at block 192E is no; or when the determination at block 194E is no—a remediation action is identified to manual evaluate the point. For example, the HUBB point (###) was originally placed at 4321 E $2^{nd}$ St. The closest serving terminal (###) was identified at a distance of 230 m. The closest unoccupied parcel (###) to the serving terminal was at a distance of 2 m. The error was remediated by moving the HUBB point to the remediated point (###) which the centroid of the parcel.

Figure 1F:
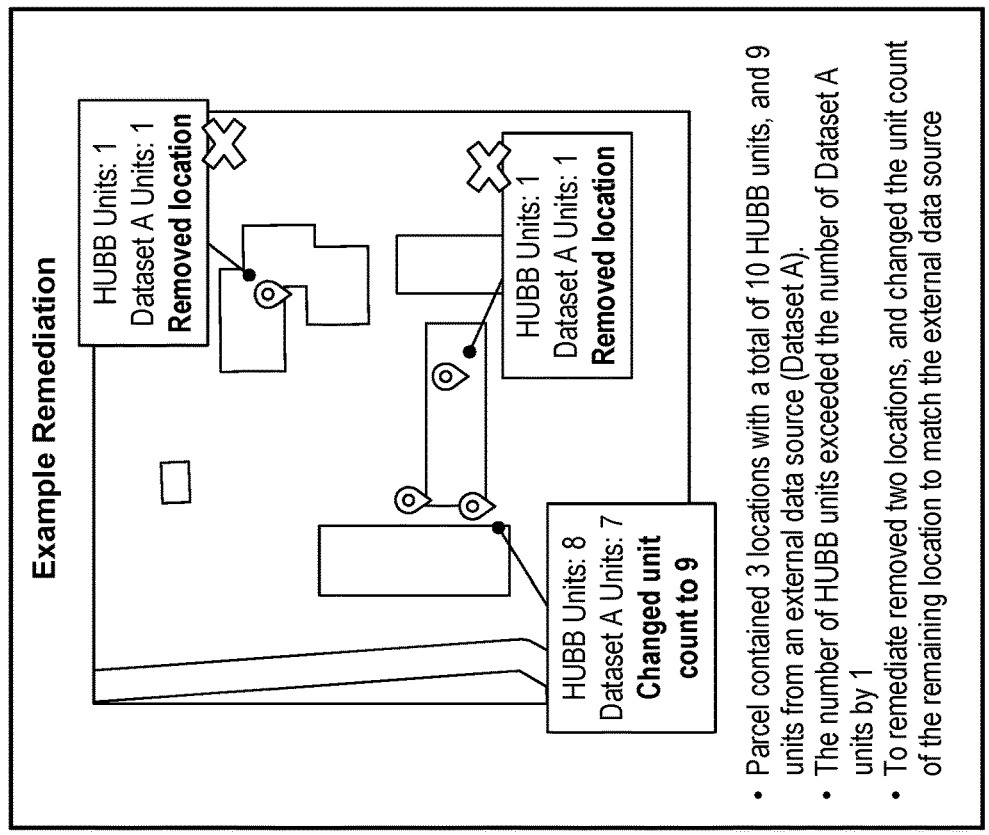
Figure 1F:
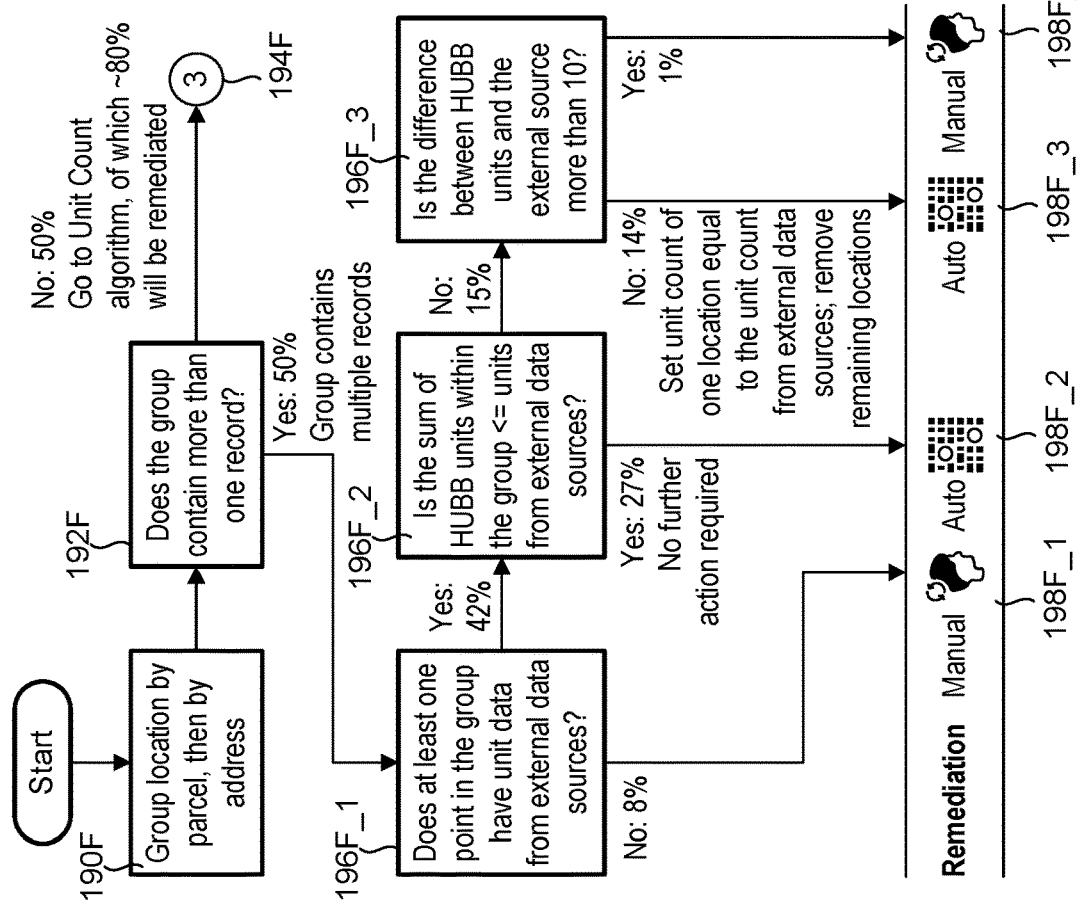

Turning to FIG. 1F, FIG. 1F illustrates the excess locations per parcel operations. The excess locations per parcel operation support determining if a unit count of a parcel exceed best external estimates, and based on determining that a unit count of a parcel exceeds best external estimates, removing excess locations and aligning the unit count. At block 190F, group locations by parcel, then by address. At block 192F, a determination is made whether the group contains more than one record. At block 196F_1—and when the determination at block 192F is yes—a determination is made whether at least on point in the group has unit data from external data sources. At block 196F_2—and when the determination at block 196F_1 is yes—a determination is made whether the sum of HUBB units within the group is less than or equal to units from the external data sources. At block 196F_3—and when the determination at block 196F_2 is no—a determination is made whether the difference between HUBB units and the external source is more than a predefined threshold (e.g., 10).

At block 194F—and when the determination at block 192F is no—a determination is made to go to unit count algorithm. At block 198F_1—and when the determination at block 196F_1 is no—a determination is made to manually remediate the point. At block 198F_2—and when the determination at block 196F_2 is no—a remediation action is made that no further action is required. At block 198F_3—and when the determination at block 196F_3 is no—a remediation action is made to set unit count of one location equal to unit count from external data and remove remaining locations. At block 198F_4—and when the determination at block 196F_3 is yes—a determination is made to manually remediate the point. For example, a parcel contained 3 location with total of 10 HUBB units, and 9 units from an external data source. The number of HUBB units exceeded the number of units in from the external data source. The remediation action include removing two locations, and changing the unit count of the remaining locations to match the external data source.

Figure 2A:
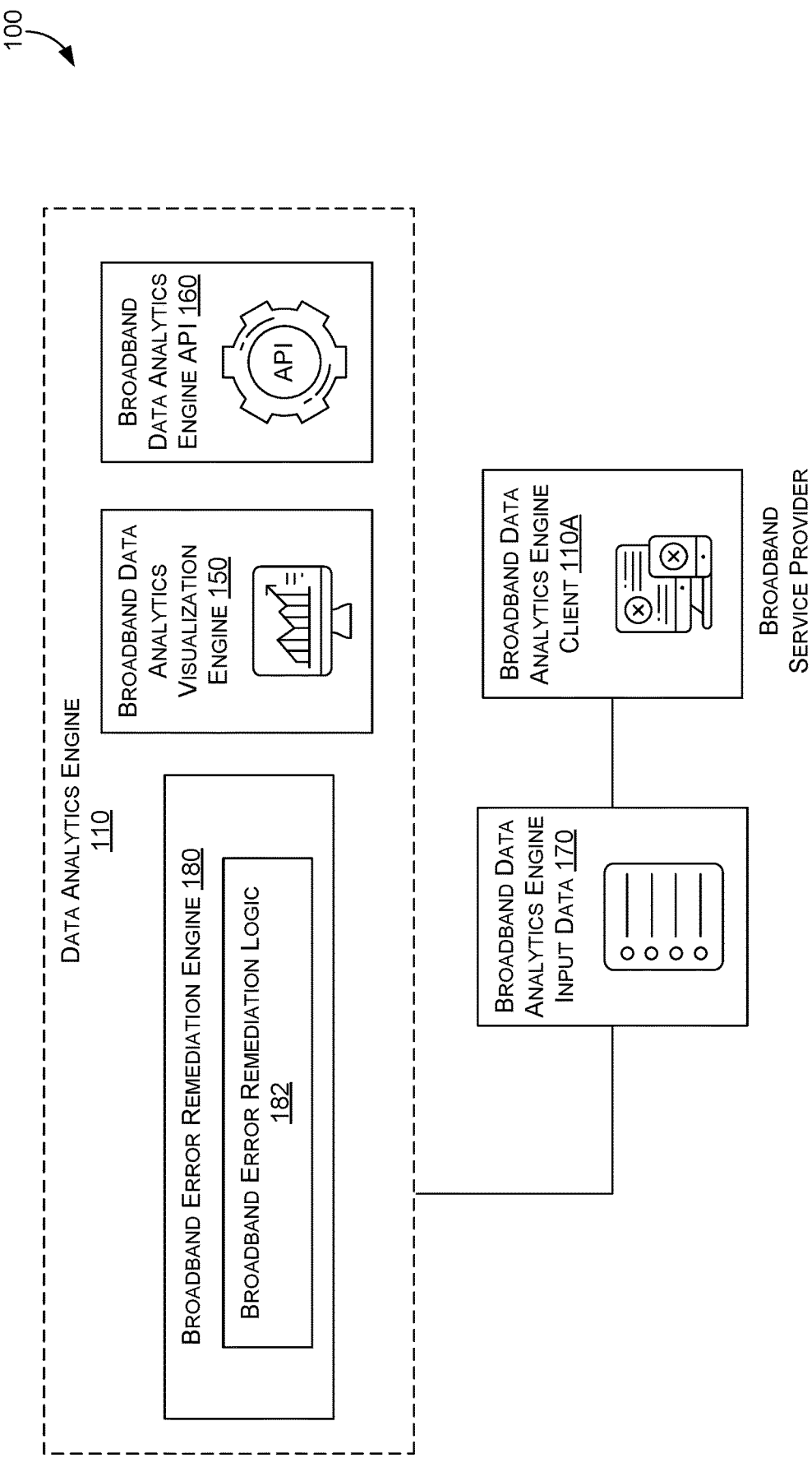
FIGS. 2A and 2B are block diagrams of an exemplary data analytics system with a broadband error remediation engine, in which embodiments described herein may be employed.
Figure 2B:
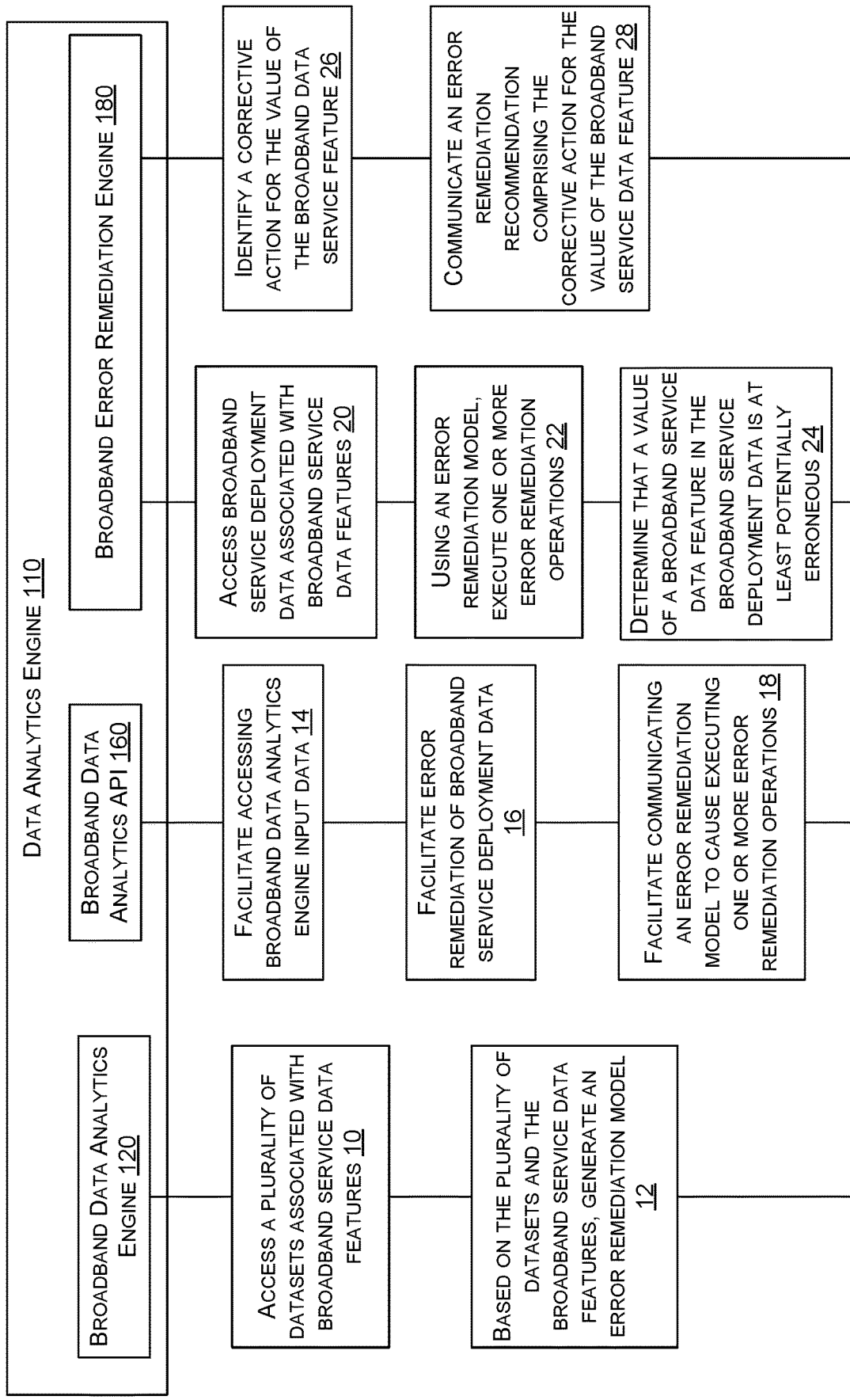

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example data analytics system 100 in which methods of the present disclosure may be employed. In particular, FIG. 2A shows a high level architecture of the data analytics system 100 in accordance with implementations of the present disclosure. Among other engines, managers, generators, selectors, or components not shown (collectively referred to herein as "components"), the technical solution environment of data analytics system 100 corresponds to FIGS. 1A and 1B.

With reference to FIG. 2A, FIG. 2A illustrates data analytics system 100 including data analytics engine 110, broadband data analytics engine client 110A, broadband data analytics engine 120, datasets 130, broadband data analytics visualization engine 150, broadband data analytics engine API 160, broadband data analytics engine input data 170.

The broadband error remediation engine 180 provides broadband error remediation logic 182 and broadband error remediation model 184. The error remediation logic 182 supports performing error remediation operations. For example, error remediation operations can include a sequence of checks and comparisons, which result in error remediation actions. The error remediation model is based on an error remediation logic 182 with a plurality of algorithms (e.g., parcel lookup, geocoder vote, equipment data, and excess parcel). For example, the error remediation logic 182 can include a sequence of checks and comparisons for proposing corrective actions and alternative values for incorrect values of broadband service data features in a broadband service deployment data.

The broadband error remediation engine 180 communicates an error remediation recommendation. The error remediation recommendation includes a corrective action for the incorrect value of the broadband service data feature. The error remediation recommendation is based on broadband service deployment data. The broadband service deployment data can include a plurality geographical regions (e.g., points) associated with addresses or parcels. The geographical regions—represented as a plurality of points in the broadband service deployment data—are associated with a set of broadband expansion target constraints that define traits that are used for targeting broadband expansion to geographical regions and a set of auditing process constraints that define compliance assessment parameters for broadband expansion to geographical regions.

The broadband error remediation engine 180 implements a broadband error remediation logic 182 via a broadband error remediation model. The error remediation model supports executing the one or more error remediation operations as sequential checks and comparisons for identifying corrective actions for incorrect values of the plurality of broadband service features in the broadband service deployment data. Executing the one or more error remediation operations is based on the plurality of datasets geo-datasets comprising geospatial datasets, spatial datasets, and address datasets and a building information model.

The broadband error remediation engine 180 can support providing different error remediation recommendations based on operations (e.g., parcel lookup operations, geocoder vote operations, and equipment data operations) associated with the error remediation model. For example, a first error remediation recommendation can be associated with parcel lookup operations that support identifying a correct parcel associated with an address in the broadband service deployment data, where the address is moved to the correct parcel. A second error remediation recommendation can be associated with geocoder vote operations that support assessing a convergence of a plurality of distinct points, where a point in the broadband service deployment data is moved to a geocoder point. A third error remediation recommendation can be associated with equipment data operations that support finding empty parcels proximate to a serving terminal, where a point in the broadband service deployment data is moved to a geocoder point.

The broadband data analytics engine client 110A can communicate broadband data analytics engine input data to generate the broadband data analytics object 140. The broadband data analytics object 140 can be provided via a broadband data analytics interface (e.g., a visualization) for managing (e.g., capturing, filtering, analyzing, validating, and communicating, and viewing) broadband service data (e.g., input data). In particular, the broadband data analytics object 140 can be used to validate broadband service deployment data (e.g., broadband data analytics engine input data 170). The broadband error remediation engine 180 and the broadband data analytics engine 120 operate with a broadband data analytics Application Programming Interface (API) 160 that facilitates accessing the broadband data analytics engine input data, wherein the broadband data analytics (API) communicates with a broadband data analytics engine client 110A of a broadband service provider.

With reference to FIG. 2B, FIG. 2B illustrates data analytics engine 110 having broadband data analytics engine 120, broadband data analytics API 160, and broadband error remediation engine 180. At block 10, access a plurality of datasets associated with broadband service data features. At block 12, based on the plurality of datasets and the broadband service data features, generate an error remediation model. At block 14, facilitate accessing broadband data analytics engine input data. At block 16, facilitate error remediation of broadband service deployment dat. At block 18, facilitate communicating an error remediation model to cause executing one or more error remediation operations.

At block 20, access broadband service deployment data associated with broadband service data features. At block 22, using an error remediation model, execute one or more error remediation operations. At block 24, determine that a value of a broadband service data feature in the broadband service deployment data is at least potentially erroneous. At block 26, identify a corrective action for the value of the broadband data service feature. At block 28, communicate an error remediation recommendation comprising the corrective action for the value of the broadband service data feature.

Exemplary Methods

Figure 3:
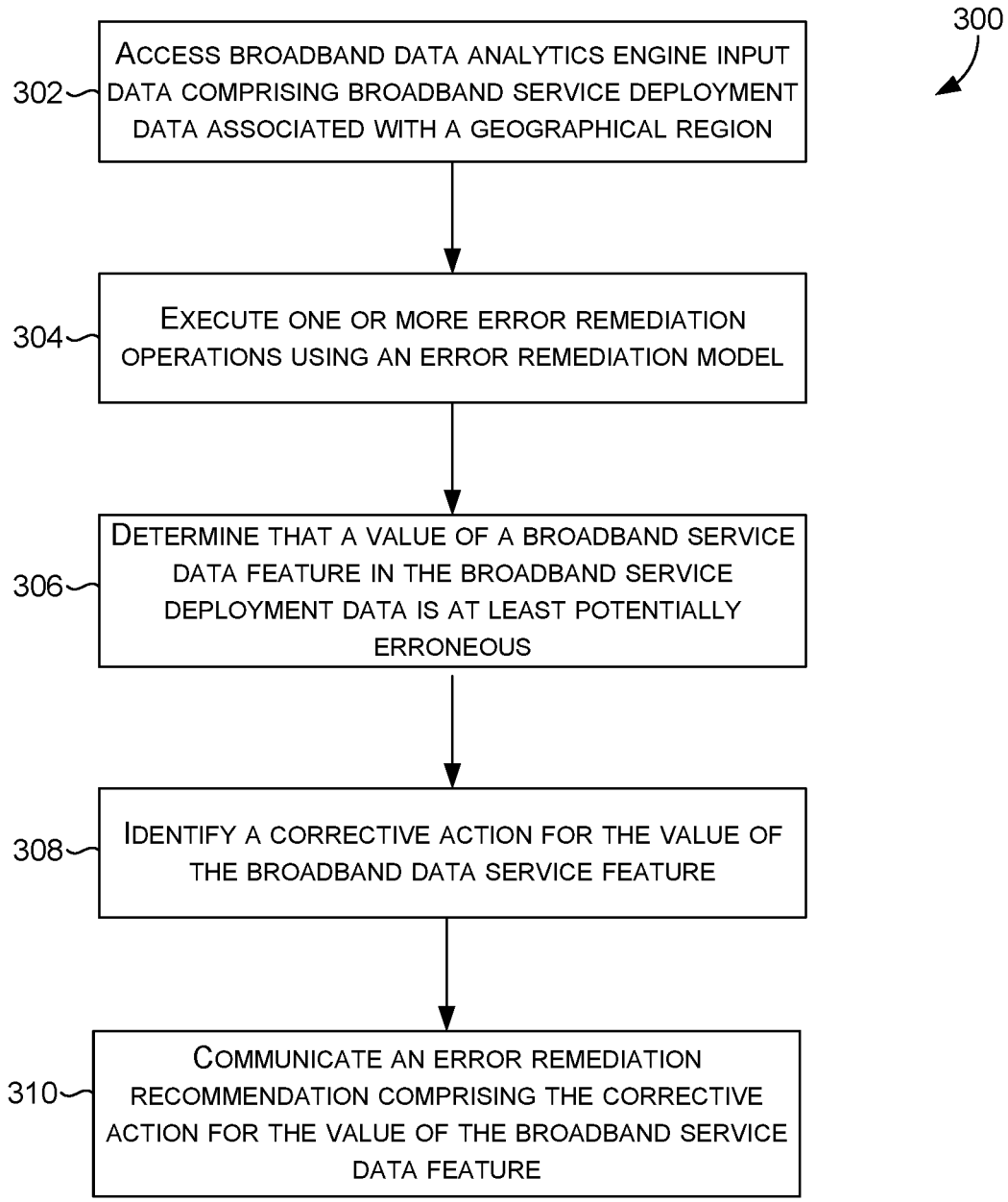
FIG. 3 is a flow diagram showing an exemplary method for implementing a data analytics system with a broadband error remediation engine, in accordance with embodiments described herein.
Figure 4:
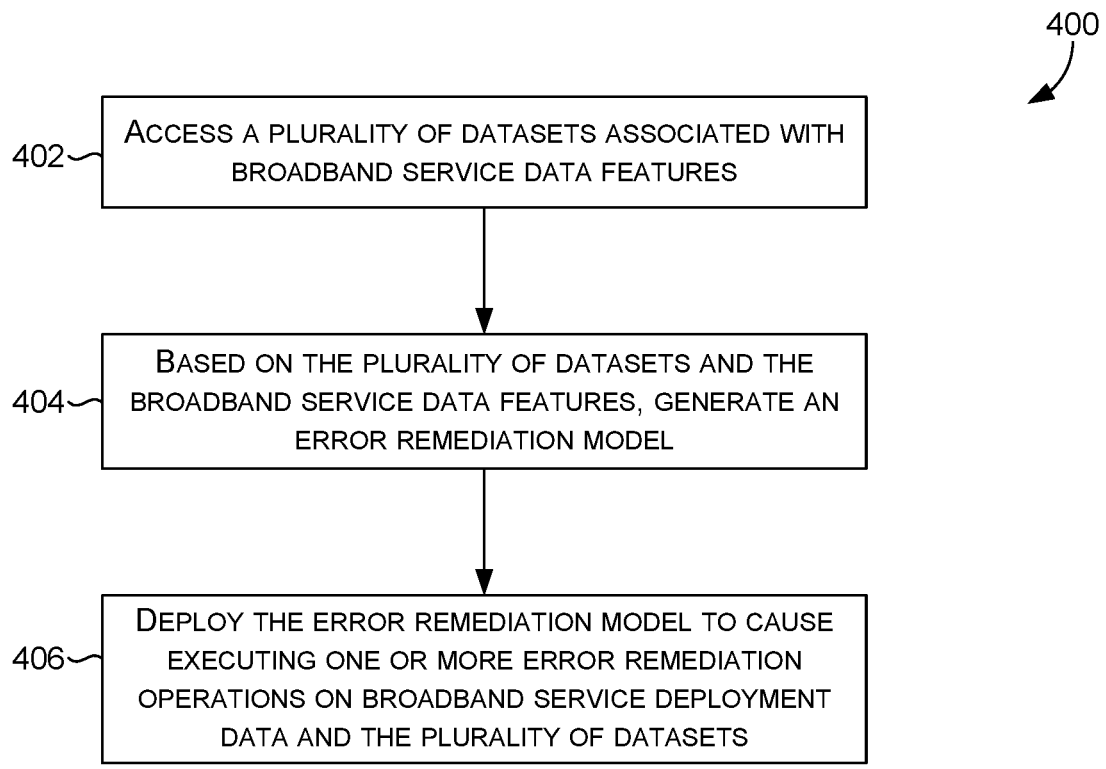
FIG. 4 is a flow diagram showing an exemplary method for implementing a data analytics system with a broadband error remediation engine, in accordance with embodiments described herein.
Figure 5:
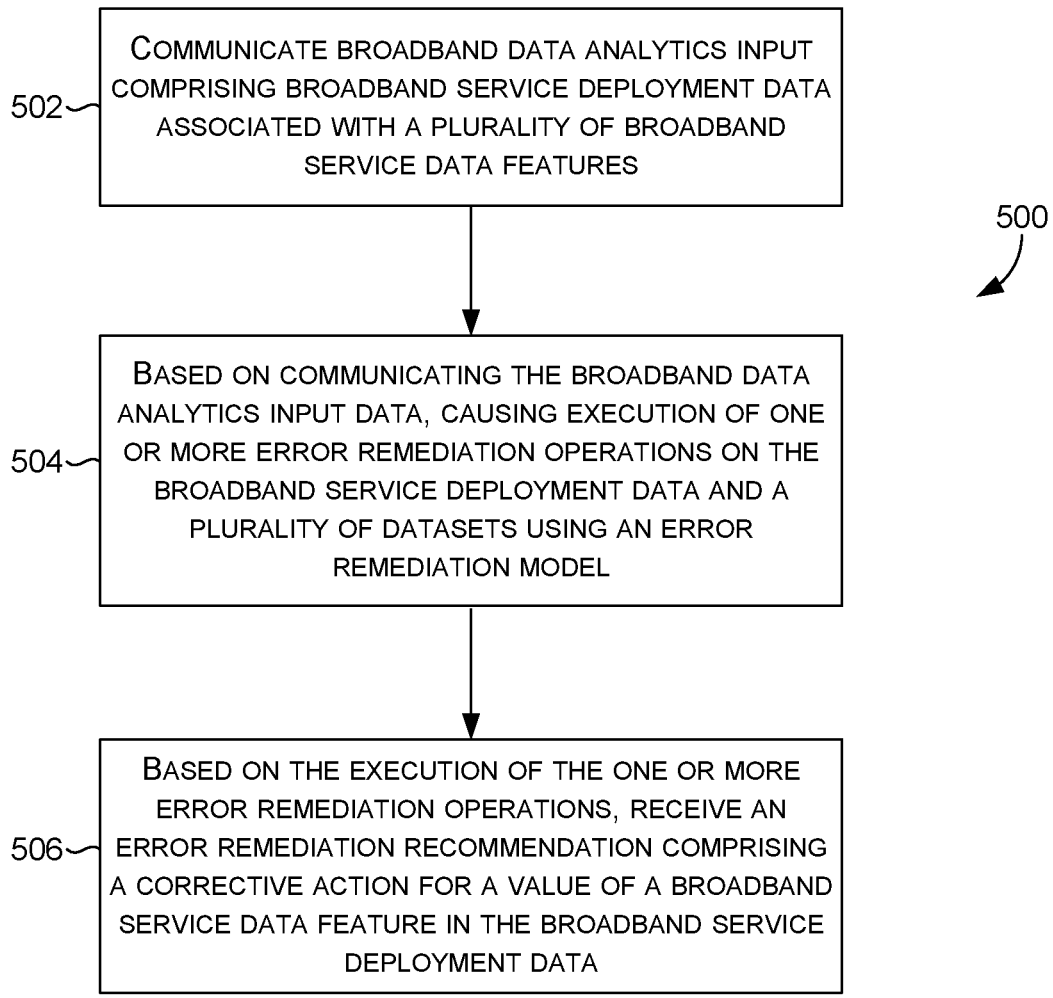
FIG. 5 is a flow diagram showing an exemplary method for implementing a data analytics system with a broadband error remediation engine, in accordance with embodiments described herein.

With reference to FIGS. 3, 4 and 5, flow diagrams are provided illustrating methods for a broadband data analytics object for a geographical region using a broadband data analytics engine in a data analytics system. The methods may be performed using the data analytics system described herein. In embodiments, one or more computer-storage media having computer-executable or computer-useable instructions embodied thereon that, when executed, by one or more processors can cause the one or more processors to perform the methods (e.g., computer-implemented method) in the virtualization system (e.g., a computerized system or computing system).

Turning to FIG. 3, a flow diagram is provided that illustrates a method 300 for providing an error remediation recommendation for flagged errors in broadband service deployment data using a broadband error remediation engine in a data analytics system. At block 302, access broadband data analytics input comprising broadband service deployment data associated with a geographical region. At block 304, execute one or more error remediation operations using an error remediation model. At block 306, determine that a value of a broadband service data feature in the broadband service deployment data is at least potentially erroneous. At block 308, identify a corrective action for the value of the broadband data service feature. At block 310, communicate an error remediation recommendation comprising the corrective action for the value of the broadband service data feature.

Turning to FIG. 4, a flow diagram is provided that illustrates a method 400 for providing an error remediation recommendation for flagged errors in broadband service deployment data using a broadband error remediation engine in a data analytics system. At block 402, access a plurality of datasets associated with broadband service data features. At block 404, based on the plurality of datasets and the broadband service data features, generate an error remediation model. At block 406, deploy the error remediation model to cause executing one or more error remediation operations on broadband service deployment data and the plurality of datasets.

Turning to FIG. 5, a flow diagram is provided that illustrates a method 500 for providing an error remediation recommendation for flagged errors in broadband service deployment data using a broadband error remediation engine in a data analytics system. At block 502, communicate the broadband data analytics input comprising broadband service deployment data associated with a plurality of broadband service data features. At block 504, based on communicating the broadband analytics input data, causing execution of the one or more error remediation operations on the broadband service deployment data and a plurality of datasets using an error remediation model. At block 506, based on the execution of the one or more error remediation operations, receive an error remediation recommendation comprising a corrective action for a value of broadband service data features in the broadband service deployment data.

Example Distributed Computing System Environment

Figure 6:
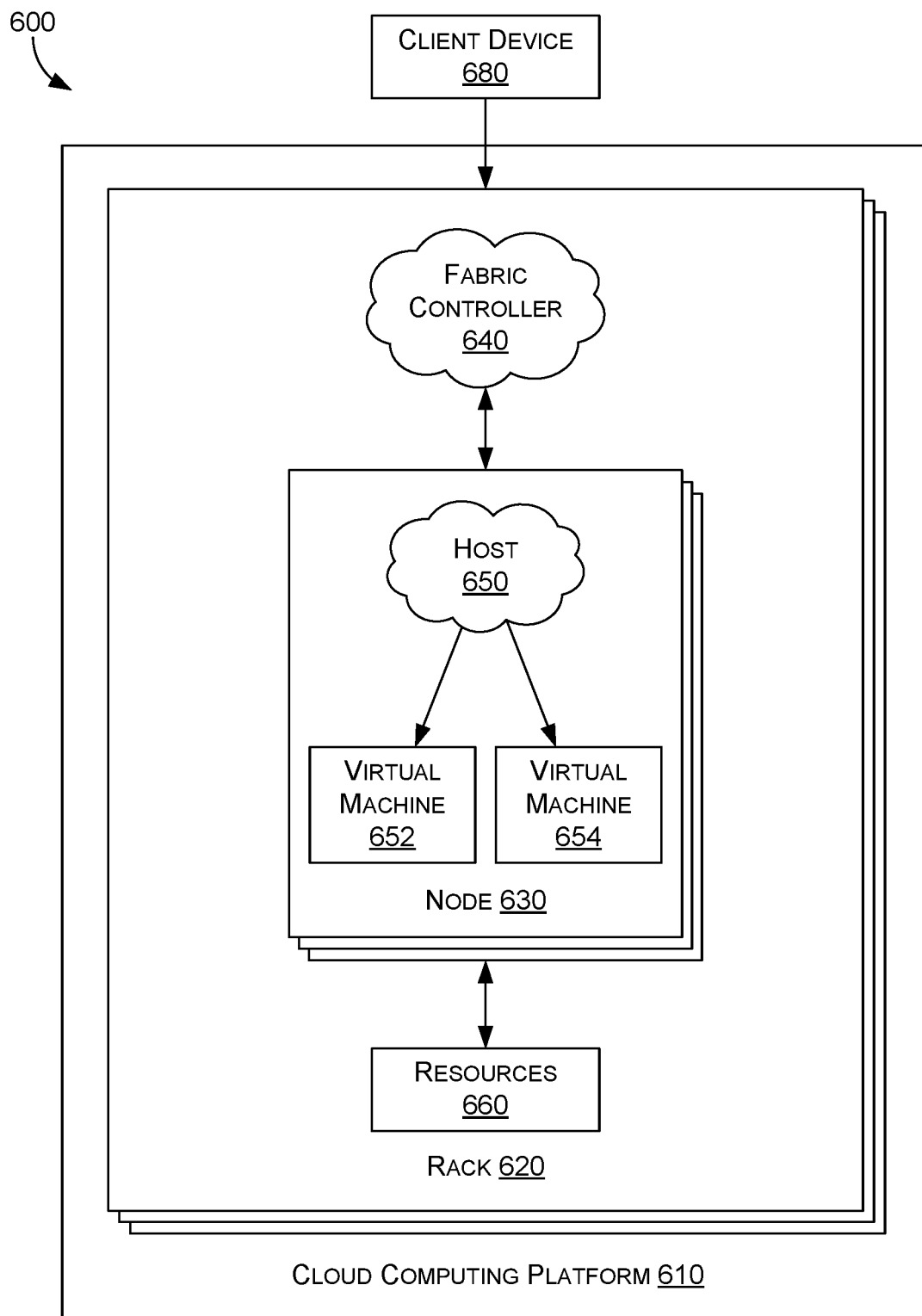
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Figure 7:
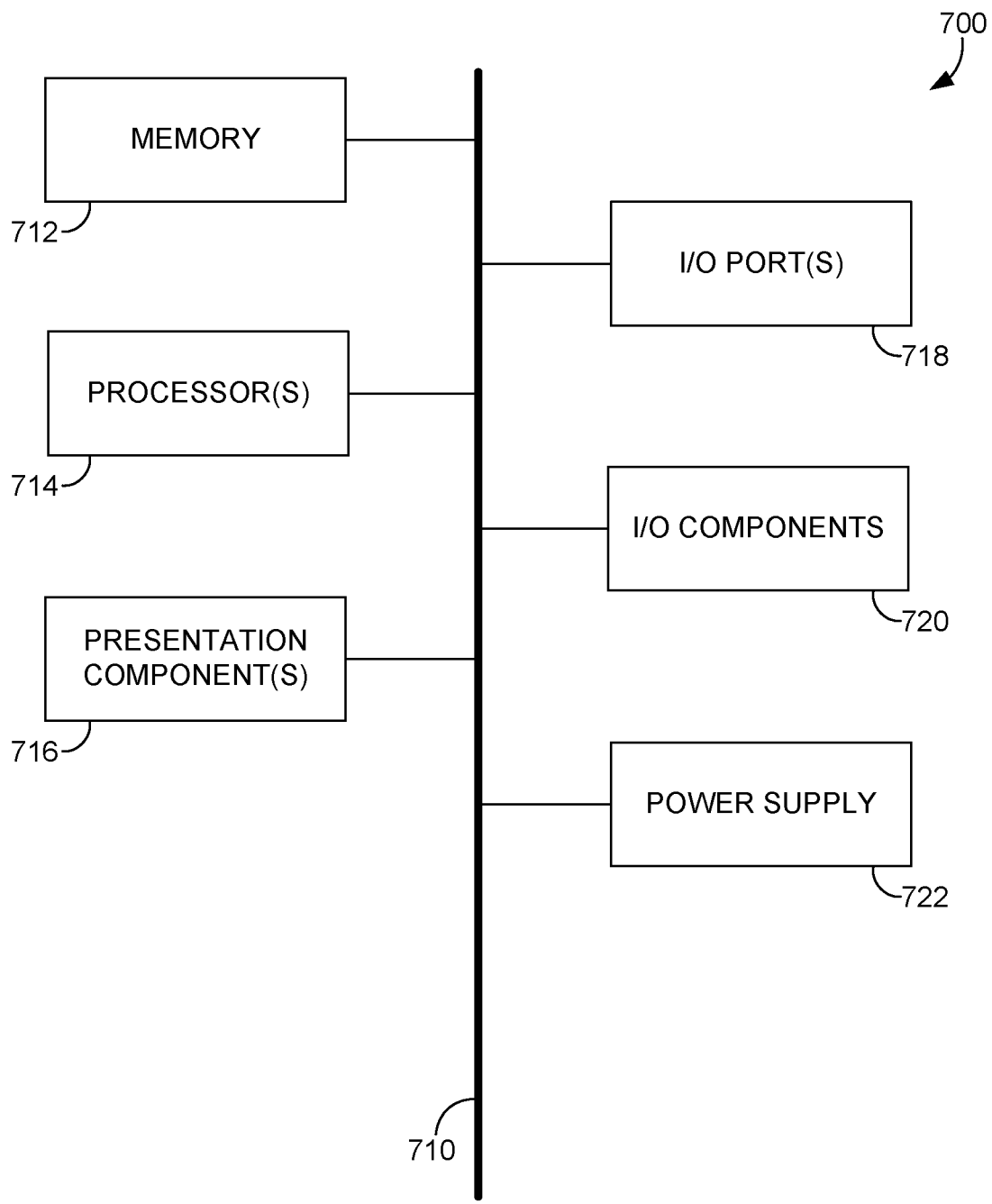
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
  one or more computer processors; and
  computer memory storing computer-useable instructions that, when used by the one or more computer processors, cause the one or more computer processors to perform operations comprising:
    accessing, at a broadband error remediation engine, broadband data analytics engine input data associated with a geographical region, wherein broadband data analytics engine input data comprises broadband service deployment data associated with a plurality of broadband service data features;
    using an error remediation model, executing one or more error remediation operations on the broadband service deployment data and a plurality of datasets, wherein the one or more error remediation operations support generating corrective actions for incorrect values in the broadband service data features in the broadband service deployment data, wherein the corrective actions are associated with error remediation recommendations;
    based on executing the one or more error remediation operations, identifying a corrective action for an incorrect value of a first broadband service data feature in the broadband service deployment data; and
    communicating an error remediation recommendation comprising the corrective action for the incorrect value of the first broadband service data feature.

2. The system of claim 1, wherein the broadband service deployment data comprises a plurality of points associated with a set of broadband expansion target constraints that define traits that are used for targeting broadband expansion to geographical regions and a set of auditing process constraints that define compliance assessment parameters for broadband expansion to geographical regions.

3. The system of claim 1, wherein the error remediation model supports executing the one or more error remediation operations as sequential checks and comparisons for identifying corrective actions for incorrect values of the plurality of broadband service features in the broadband service deployment data,
  wherein executing the one or more error remediation operations is based on the plurality of datasets comprising geospatial datasets, spatial datasets, and address datasets and a building information model.

4. The system of claim 1, wherein the error remediation recommendation is associated with parcel lookup operations that support identifying a correct parcel associated with an address in the broadband service deployment data, wherein the address is moved to the correct parcel.

5. The system of claim 1, wherein the error remediation recommendation is associated with geocoder vote operations that support assessing a convergence of a plurality of distinct points, wherein a point in the broadband service deployment data is moved to a geocoder point.

6. The system of claim 1, wherein the error remediation recommendation is associated with equipment data operations that support finding empty parcels proximate to a serving terminal, wherein a point in the broadband service deployment data is moved to a geocoder point.

7. The system of claim 1, wherein the error remediation model supports dynamic prioritization of the plurality datasets based on a quality of the plurality of datasets for a selected geographical region, wherein the geographical region is one or of the broadband service data features in the broadband service deployment data.

8. The system of claim 1, wherein the broadband error remediation engine and a broadband data analytics engine operate with a broadband data analytics Application Programming Interface (API) that facilitates accessing the broadband data analytics engine input data, wherein the broadband data analytics (API) communicates with a broadband data analytics engine client of a broadband service provider.

9. A computer-implemented method, the method comprising:
  accessing, at a broadband error remediation engine, broadband data analytics engine input data associated with a geographical region, wherein broadband data analytics engine input data comprises broadband service deployment data associated with a plurality of broadband service data features;
  using an error remediation model, executing one or more error remediation operations on the broadband service deployment data and a plurality of datasets, wherein the one or more error remediation operations support generating corrective actions for incorrect values in the broadband service data features in the broadband service deployment data, wherein the corrective actions are associated with error remediation recommendations;

based on executing the one or more error remediation operations, identifying a corrective action for an incorrect value of a first broadband service data feature in the broadband service deployment data; and communicating an error remediation recommendation comprising the corrective action for the incorrect value of the first broadband service data feature.

10. The method of claim 9, wherein the broadband service deployment data comprises a plurality of points associated with a set of broadband expansion target constraints that define traits that are used for targeting broadband expansion to geographical regions and a set of auditing process constraints that define compliance assessment parameters for broadband expansion to geographical regions.

11. The method of claim 9, wherein the error remediation model supports executing the one or more error remediation operations as sequential checks and comparisons for identifying corrective actions for incorrect values of the plurality of broadband service features in the broadband service deployment data, wherein executing the one or more error remediation operations is based on the plurality of datasets comprising geospatial datasets, spatial datasets, and address datasets and a building information model.

12. The method of claim 9, wherein the broadband service deployment data comprises a plurality of points associated with a set of broadband expansion target constraints that define traits that are used for targeting broadband expansion to geographical regions and a set of auditing process constraints that define compliance assessment parameters for broadband
expansion to geographical regions.

13. The method of claim 9, wherein the error remediation recommendation is associated with geocoder vote operations that support assessing a convergence of a plurality of distinct points, wherein a point in the broadband service deployment data is moved to a geocoder point.

14. The method of claim 9, wherein the error remediation recommendation is associated with equipment data operations that support finding empty parcels proximate to a serving terminal, wherein a point in the broadband service deployment data is moved to a geocoder point.

15. One or more computer-storage media having computer-executable instructions embodied thereon that, when executed by a computing system having a processor and memory, cause the processor to perform operations comprising:

accessing, at a broadband error remediation engine, broadband data analytics engine input data associated with a geographical region, wherein broadband data analytics engine input data comprises broadband service deployment data associated with a plurality of broadband service data features;

using an error remediation model, executing one or more error remediation operations on the broadband service deployment data and a plurality of datasets, wherein the one or more error remediation operations support generating corrective actions for incorrect values in the broadband service data features in the broadband service deployment data, wherein the corrective actions are associated with error remediation recommendations;

based on executing the one or more error remediation operations, identifying a corrective action for an incorrect value of a first broadband service data feature in the broadband service deployment data; and communicating an error remediation recommendation comprising the corrective action for the incorrect value of the first broadband service data feature.

16. The media of claim 15, wherein the error remediation model supports executing the one or more error remediation operations as sequential checks and comparisons for identifying corrective actions for incorrect values of the plurality of broadband service features in the broadband service deployment data, wherein executing the one or more error remediation operations is based on the plurality of datasets comprising geospatial datasets, spatial datasets, and address datasets and a building information model.

17. The media of claim 15, wherein the error remediation recommendation is associated with parcel lookup operations that support identifying a correct parcel associated with an address in the broadband service deployment data, wherein the address is moved to the correct parcel.

18. The media of claim 15, wherein the error remediation recommendation is associated with geocoder vote operations that support assessing a convergence of a plurality of distinct points, wherein a point in the broadband service deployment data is moved to a geocoder point.

19. The media of claim 15, wherein the error remediation recommendation is associated with equipment data operations that support finding empty parcels proximate to a serving terminal, wherein a point in the broadband service deployment data is moved to a geocoder point.

20. The media of claim 17, wherein the broadband error remediation engine and a broadband data analytics engine operate with a broadband data analytics Application Programming Interface (API) that facilitates accessing the broadband data analytics engine input data, wherein the broadband data analytics (API) communicates with a broadband data analytics engine client of a broadband service provider.

\* \* \* \* \*